United States Patent
Yum

(10) Patent No.: US 7,941,137 B2
(45) Date of Patent: May 10, 2011

(54) MOBILE TERMINAL AND METHOD OF VISUAL DATA PROCESSING

(75) Inventor: Sang Bok Yum, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 942 days.

(21) Appl. No.: 11/740,123

(22) Filed: Apr. 25, 2007

(65) Prior Publication Data

US 2007/0275714 A1 Nov. 29, 2007

(30) Foreign Application Priority Data

May 25, 2006 (KR) .................. 10-2006-0047005

(51) Int. Cl.
*H04Q 7/20* (2006.01)
(52) U.S. Cl. .................. 455/426.1; 455/419; 348/211.2; 348/14.02
(58) Field of Classification Search .................. None
See application file for complete search history.

(56) References Cited

U.S. PATENT DOCUMENTS

| | | | |
|---|---|---|---|
| 2003/0112259 A1* | 6/2003 | Kinjo | 345/700 |
| 2006/0145944 A1* | 7/2006 | Tarlton et al. | 345/2.3 |

FOREIGN PATENT DOCUMENTS

| | | |
|---|---|---|
| EP | 1326409 | 7/2003 |
| EP | 1549067 | 6/2005 |

* cited by examiner

*Primary Examiner* — Phuoc Doan
(74) *Attorney, Agent, or Firm* — Lee, Hong, Degerman, Kang & Waimey

(57) ABSTRACT

A mobile terminal and visual data processing method are provided which an image photographing function is performed while maintaining visual communication between a first and second terminal. The present invention includes a camera, a communication unit performing visual communication with another terminal, a storage unit storing at least one image, a display unit displaying visual data related to the visual communication, a control unit controlling the camera to perform an image photographing function when an activation signal is received, wherein the visual communication with the other terminal is maintained while the image photographing function is performed if the activation signal is received while the visual communication is in progress.

29 Claims, 12 Drawing Sheets

MOBILE TERMINAL AND METHOD OF VISUAL DATA PROCESSING

This application claims the benefit of the Korean Patent Application No. 10-2006-0047005, filed on May 25, 2006, which is hereby incorporated by reference as if fully set forth herein.

FIELD OF THE INVENTION

The present invention is directed to a mobile terminal, and more particularly, to a mobile terminal and visual data processing method. Although the present invention is suitable for a wide scope of applications, it is particularly suitable for a mobile terminal provided with a visual communication function.

DESCRIPTION OF THE RELATED ART

Mobile terminals equipped with various cameras for photographing objects and storing the photographs as image files have been developed. A mobile terminal equipped with a camera also facilitates visual communication.

FIG. 1 is an exemplary diagram for explaining a related art visual communication. As illustrated in FIG. 1, communications are facilitated via display screens of terminals 10, 20 while users are viewing each other.

A camera can be provided in each of the terminals 10, 20 in various ways. For example, a camera can be provided in the same direction as a display screen. Alternatively, a camera can be provided in a direction opposite to that of a display screen.

A camera should face a user for a visual communication. However, a user is unable to capture images, such as a photograph or moving picture, during the course of a visual communication. Therefore, a user must enter a camera photographing menu after stopping the visual communication in order to photograph an image.

To solve this problem, an image can be stored during the course of a visual communication for transmission to another user's terminal. However, a quality of the image stored during the course of the visual communication is inferior to an image photographed using the camera photographing menu.

SUMMARY OF THE INVENTION

An object of the present invention is to provide a mobile terminal and visual data processing method by which an image photographing function is facilitated while a visual communication is maintained between terminals. Another object of the present invention is to provide a mobile terminal and visual data processing method by which visual communication is performed smoothly in a manner that a second terminal displays an image that replaces an image from a first terminal when the first terminal utilizes an image photographing function.

In one aspect of the present invention, a method of processing visual data in a mobile terminal is provided. The method includes establishing visual communication with another terminal, receiving a request to activate an image photographing function while the visual communication is in progress and activating the image photographing function while maintaining the visual communication.

It is contemplated that receiving the request to activate the image photographing function includes at least one detecting selection of an image photographing menu, detecting entry of a previously set key signal and detecting rotation of a camera.

It is further contemplated that the method further includes displaying both a preview image received from a camera and visual data received from the other terminal on a display unit.

It is contemplated that the method further includes transmitting at least one image to the other terminal when the image photographing function is activated. It is further contemplated that the at least one image includes one of a preview image received from a camera, a last visual communication frame image prior to activating the image photographing function and an image stored by a user of the mobile terminal.

It is contemplated that the method further includes deactivating the image photographing function upon completion of image photographing. It is further contemplated that the method further includes transmitting a photographed image to the other terminal according to a selection made by a user of the mobile terminal.

In another aspect of the present invention, a mobile terminal is provided. The mobile terminal includes a camera, a communication unit performing visual communication with another terminal, a storage unit storing at least one image, a display unit displaying visual data related to the visual communication and a control unit controlling the camera to perform an image photographing function when an activation signal is received, wherein the visual communication with the other terminal is maintained while the image photographing function is performed if the activation signal is received while the visual communication is in progress.

It is contemplated that the activation signal includes at least one of a signal for selecting an image photographing menu, a preset key signal and a signal indicating rotation of the camera. It is further contemplated that the control unit displays both a preview image received from the camera and visual data received from the other terminal on the display unit.

It is further contemplated that the control unit transmits the at least one image to the other terminal when the image photographing function is activated, the at least one image transmitted via the communication unit.

It is contemplated that the at least image includes one of a preview image received from the camera, a last visual communication image prior to activation of the image photographing function and an image stored by a user of the mobile terminal.

It is further contemplated that the control unit deactivates the image photographing function upon completion of image photographing.

It is further contemplated that the control unit transmits a photographed image to the other terminal via the communicating unit according to a selection made by a user of the mobile terminal.

In another aspect of the present invention, a method of processing visual data in a mobile terminal is provided. The method includes establishing visual communication with another terminal, displaying visual data of the other terminal, determining that the other terminal activates an image photographing function while the visual communication is in progress and replacing the visual data of the other terminal with a replacement image.

It is contemplated that determining that the other terminal activates the image photographing function comprises at least one of receiving a signal from the other terminal (FIG. 8), determining that visual data of the other terminal is not received for a preset time while the visual communication is in progress, and determining that a photographed image is received from the other terminal.

It is further contemplated that the replacement image is at least one of an image received from the other terminal, a preview image received from a camera, a last visual communication frame image before the other terminal activated the image photographing function and an image stored by a user of the mobile terminal.

In another aspect of the present invention, a mobile terminal is provided. The mobile terminal includes a camera, a communication unit establishing visual communication with another terminal, a display unit displaying visual data of the other terminal, a storage unit storing a replacement image and a control unit determining that the other terminal activates an image photographing function while the visual communication is in progress and replacing the visual data of the other terminal on the display unit with the replacement image.

It is contemplated that the control unit determines that the other terminal activates the image photographing function comprises receiving a signal from the other terminal, determining that visual data of the other terminal is not received for a preset time while the visual communication is in progress, and receiving a photographed image from the other terminal.

It is further contemplated that the replacement image is at least one of an image received from the other terminal, a preview image received from a camera, a last visual communication frame image before the other terminal activated the image photographing function and an image stored by a user of the mobile terminal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will be made in detail to the preferred embodiments of the present invention, examples of which are illustrated in the accompanying drawings. Wherever possible, the same reference numbers will be used throughout the drawings to refer to the same or like parts.

The present invention is applicable to various types of terminals, such as game players, digital cameras, PMPs, digital broadcast receiving terminals, PDAs, mobile phones, and smart phones. For convenience of explanation, it is assumed in the following description that the present invention is applied to a mobile terminal, such as a mobile phone. However, it will be apparent to those skilled in the art that the present invention is not limited to a mobile terminal.

A mobile terminal according to the present invention is equipped with a visual communication function. The mobile terminal according to the present invention has access to a mobile communication network or a wireless Internet in order to perform the visual communication function.

Specifically, visual communication between mobile terminals can be accomplished via the mobile communication network and visual communication between a mobile terminal and a personal computer can be accomplished via the wireless Internet. The mobile terminal according to the present invention can also utilize ad-hoc communication for performing communication without access points.

The mobile terminal according to the present invention is capable of performing group communications, including point-to-multipoint visual communication, as well as a point-to-point visual communication, the details of which are omitted in the following description. However, It will be apparent that the present invention is not so limited.

An image photographing function of the present invention corresponds to a related art menu function to facilitate picture photographing, moving picture photographing, or special photographing using a camera. Specifically, a user is able to enter a mode for performing an image photographing function during the course of a visual communication.

Figure 1:
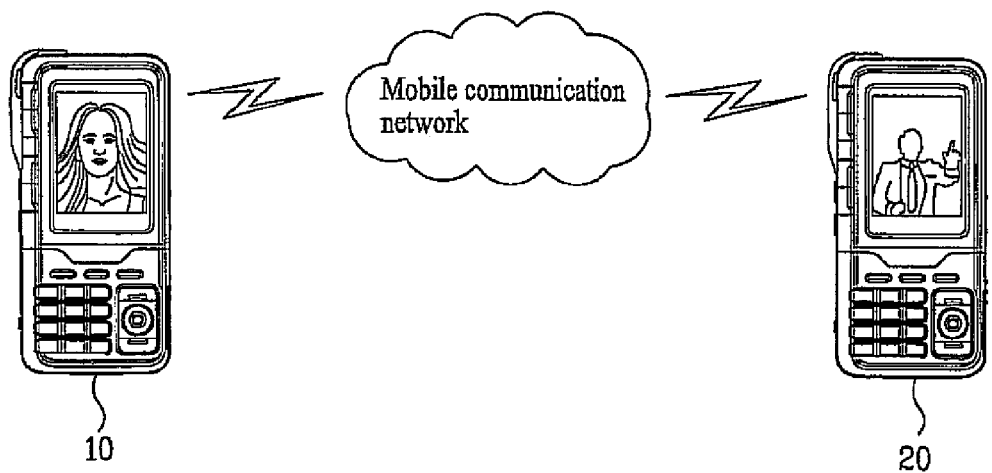
FIG. 1 is an exemplary diagram for explaining a related art visual communication.
Figure 2:
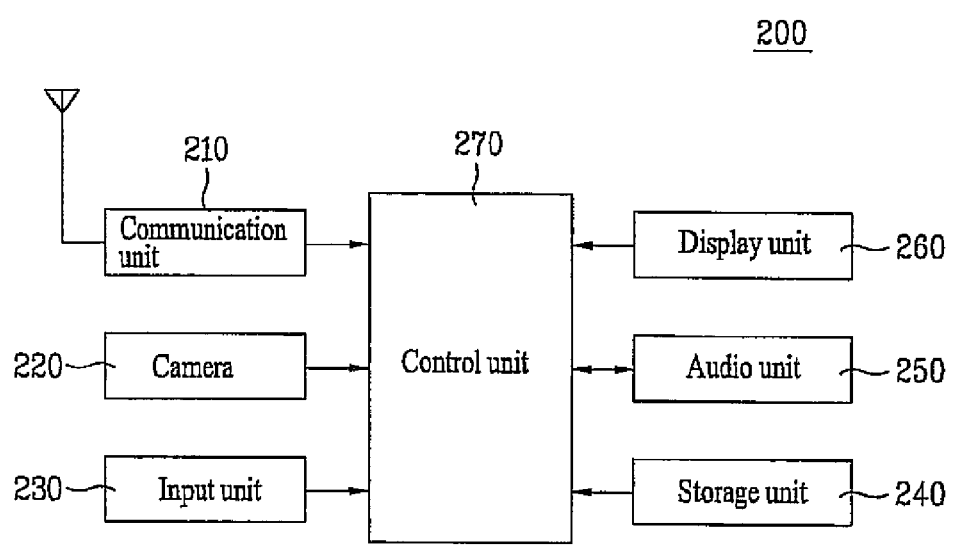
FIG. 2 is a block diagram of a mobile terminal provided with a visual communication function according to the present invention.

FIG. 2 is a block diagram of a mobile terminal 200 provided with a visual communication function according to the present invention. As illustrated in FIG. 2, the mobile terminal 200 includes a communication unit 210, a camera 220, an input unit 230, a storage unit 240, an audio unit 250, a display unit 260, and a control unit 270. The control unit 270 controls overall operations of the mobile terminal 200.

The communication unit 210 receives signals for visual communication with another terminal using a mobile communication network. Specifically, the communication unit 210 modulates visual data input from the camera 220 into a wireless signal and then transmits the modulated wireless signal to the other terminal.

The communication unit 210 demodulates a wireless signal received from the other terminal into visual data and then outputs video and audio for the demodulated visual data to the display unit 260 and the audio unit 250, respectively, under control of the control unit 270. The communication unit 210 can include various communication modules. For example, the communication unit 210 can include a Bluetooth module for short-distance wireless communication with the other terminal, an IrDA (infrared data association) module, or a Zigbee module.

The camera 220 converts an image incident on a lens to an electrical signal and then outputs the electrical signal. The input unit 230 includes a plurality of numeral keys and function keys and outputs key signals for the keys to the control unit 270.

Preferably, the input unit 230 includes a separate key to generate a signal to the control unit 270 for activating a photographing function while a visual communication is maintained according to the present invention. Alternatively, the input unit 230 can include a touch pad or touch screen.

The storage unit 240 stores programs for controlling overall operations of the mobile terminal 200 and various types of data input/output when performing a control operation of the mobile terminal 200. The storage unit 240 also stores an image photographed using the image photographing function as well as visual data received from another terminal while visual communication is maintained with the other terminal.

The audio unit 250 converts sound data stored in the storage unit 240 to an analog signal under the control of the control unit 270 and then outputs the analog signal to a speaker. The audio unit 250 also converts audio corresponding to the visual data demodulated by the communication unit 210 to an analog signal and then outputs the analog signal to the speaker.

The display unit 260 displays data corresponding to the key signal of the input unit 230. The display unit 260 also displays an operational status of the mobile terminal 200 and a plurality of information as icons and characters.

The display unit 260 displays preview visual data received from the camera 220 and displays visual data of the other terminal received from the communication unit on a visual communication screen under the control of the control unit 270. The display unit 260 is able to display both the preview visual data received from the camera 220 and the visual data of the other terminal together.

Figure 3:
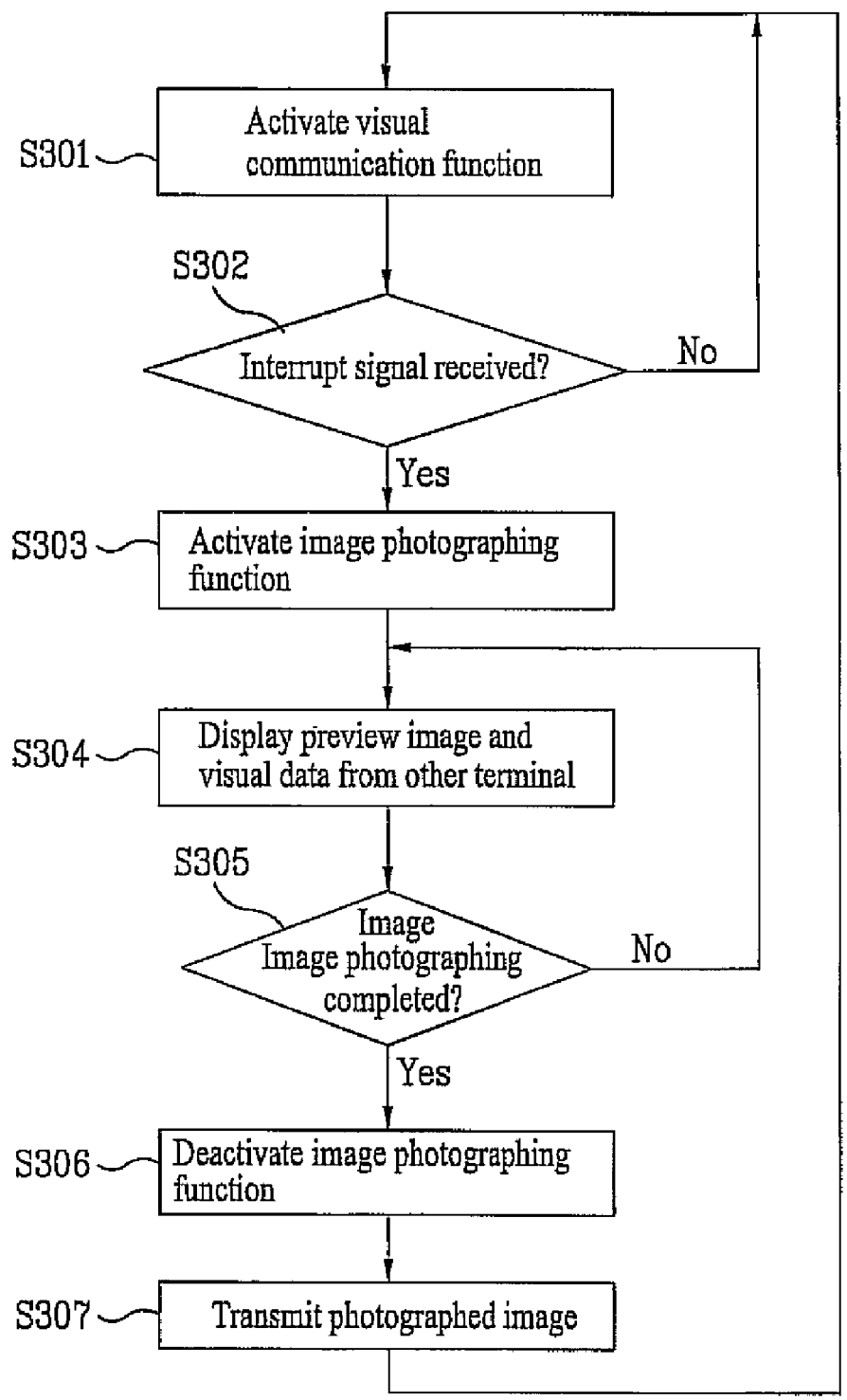
FIG. 3 is a flowchart of a method of processing visual data in a mobile terminal according to a first embodiment of the present invention.

FIG. 3 is a flowchart of a method of processing visual data in a terminal 200 according to a first embodiment of the present invention. As illustrated in FIG. 3, a visual communication function is activated to perform visual communication with another terminal (S301). When an interrupt signal is received via the input unit 230 during the visual communication (S302), the control unit 270 activates an image photographing function while maintaining the visual communication function (S303).

Specifically, the activated image photographing function is executed in addition to the visual communication function instead of terminating the visual communication function. The interrupt signal is a signal for activating the image photographing function according to the present invention.

The interrupt signal may be a signal generated when a user of the terminal 200 selects an image photographing menu via the input unit 230. The interrupt signal may be a signal generated by an image photographing dedicated key provided on one side of the terminal 200. The interrupt signal may be a signal generated by detecting rotation when the user of the terminal 200 rotates the camera 220, which was facing the user.

The control unit 270 displays a preview image received from the camera 220 and visual data of the other terminal on the display unit 260 when the image photographing function is activated (S304). The control unit 270 is able to display both the preview image and the visual data of the second terminal according to a user's selection. The preview image and the visual data are displayed such that the size of the displayed preview image differs from the size of the displayed visual data of the other terminal.

When the image photographing function is completed (s305), the control unit 270 deactivates the image photographing function (S306), transmits the photographed image (S307) and then returns to the visual communication function. Specifically, the control unit 270 returns to the visual communication function and transmits visual communication data received from the camera to the correspondent terminal when the image photographing function is completed. The control unit 270 also stores the photographed image in the storage unit 240.

Figure 4A:
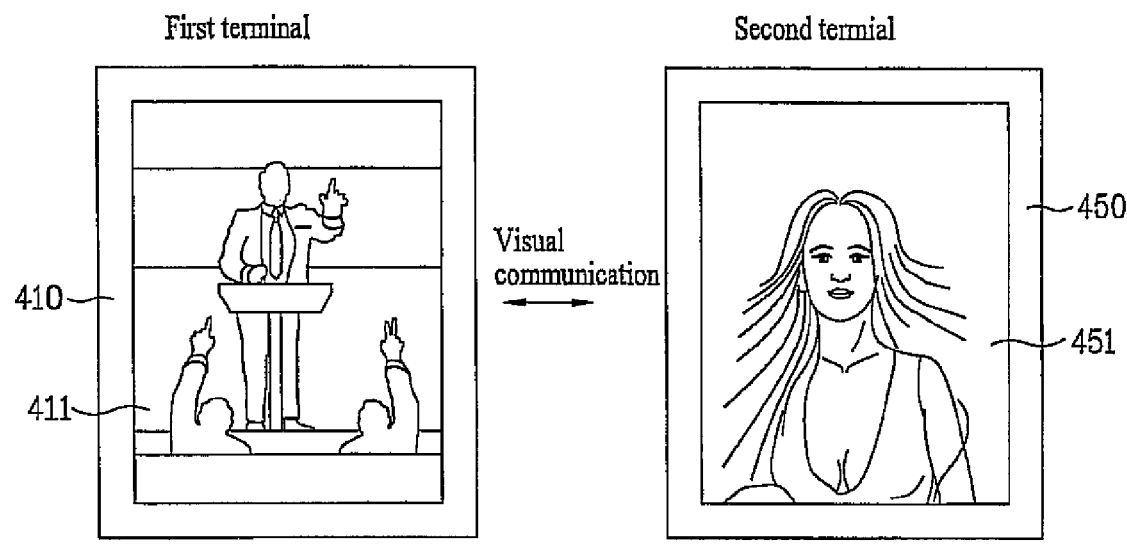
FIGS. 4A to 4G are diagrams illustrating the method of processing visual data in a mobile terminal according to the first embodiment of the present invention.

FIGS. 4A to 4G are diagrams for explaining the method of processing visual data in a mobile terminal according to the first embodiment of the present invention. As illustrated in FIGS. 4A to 4G, a first screen 410 is a visual communication screen of a first terminal and a second screen 450 is a visual communication screen of a second terminal. Specifically, visual data 411 of the second terminal is displayed on the first screen 410 and visual data 451 of the first terminal is displayed on the second screen 450, as illustrated in FIG. 4A.

The first terminal activates the image photographing function and displays a preview image 412 currently received from a camera and the visual data 411 of the second terminal when a signal for activating the image photographing function is input by a user. The first terminal displays the preview image 412 and the visual data 411 of the second terminal in various forms according to a user's selection.

Figure 4B:
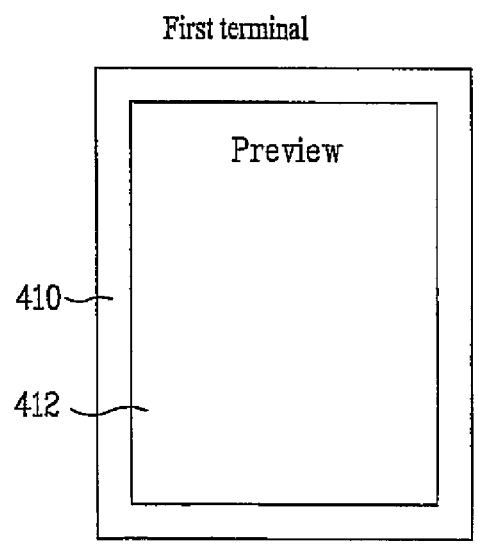
Figure 4C:
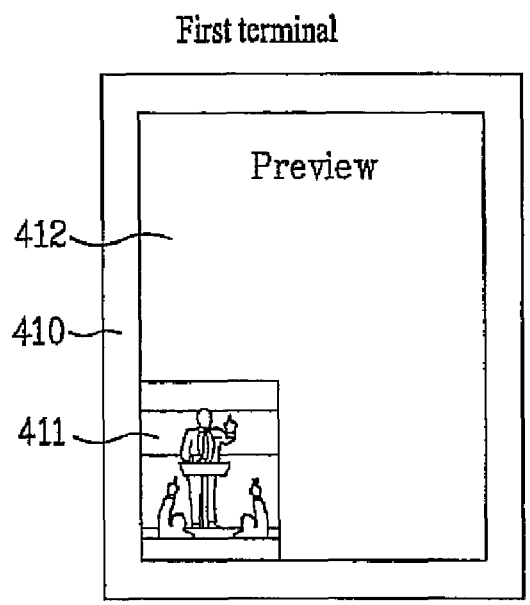
Figure 4D:
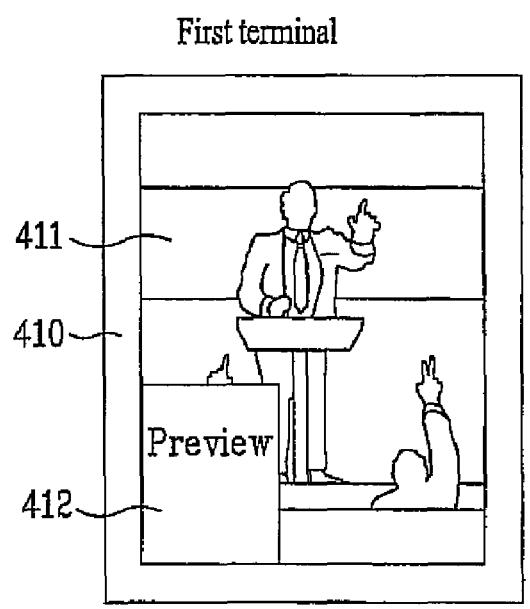

The first terminal may display only the preview image 412, as illustrated in FIG. 4B. The first terminal may display both the preview image 412 and the visual data 411 of the second terminal together such that the preview image is larger than the visual data, as illustrated in FIG. 4C. The first terminal may display both the preview image 412 and the visual data 411 of the second terminal together such that the visual data of the second terminal is larger than the preview image, as illustrated in FIG. 4D.

Figure 4E:
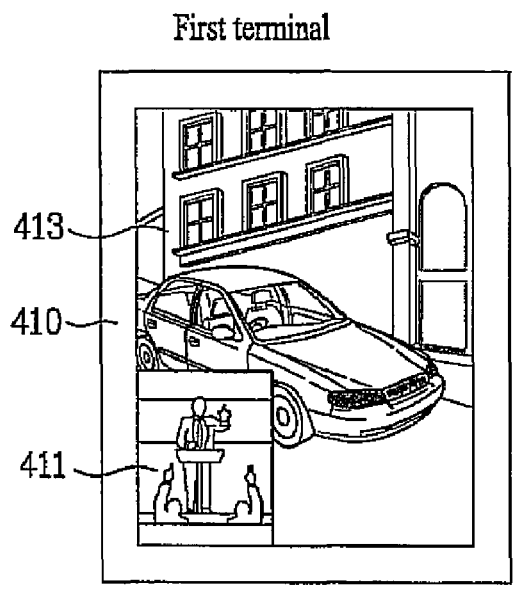
Figure 4F:
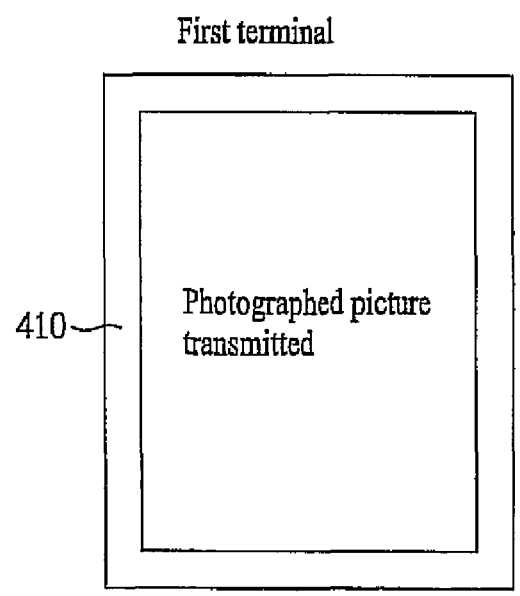
Figure 4G:
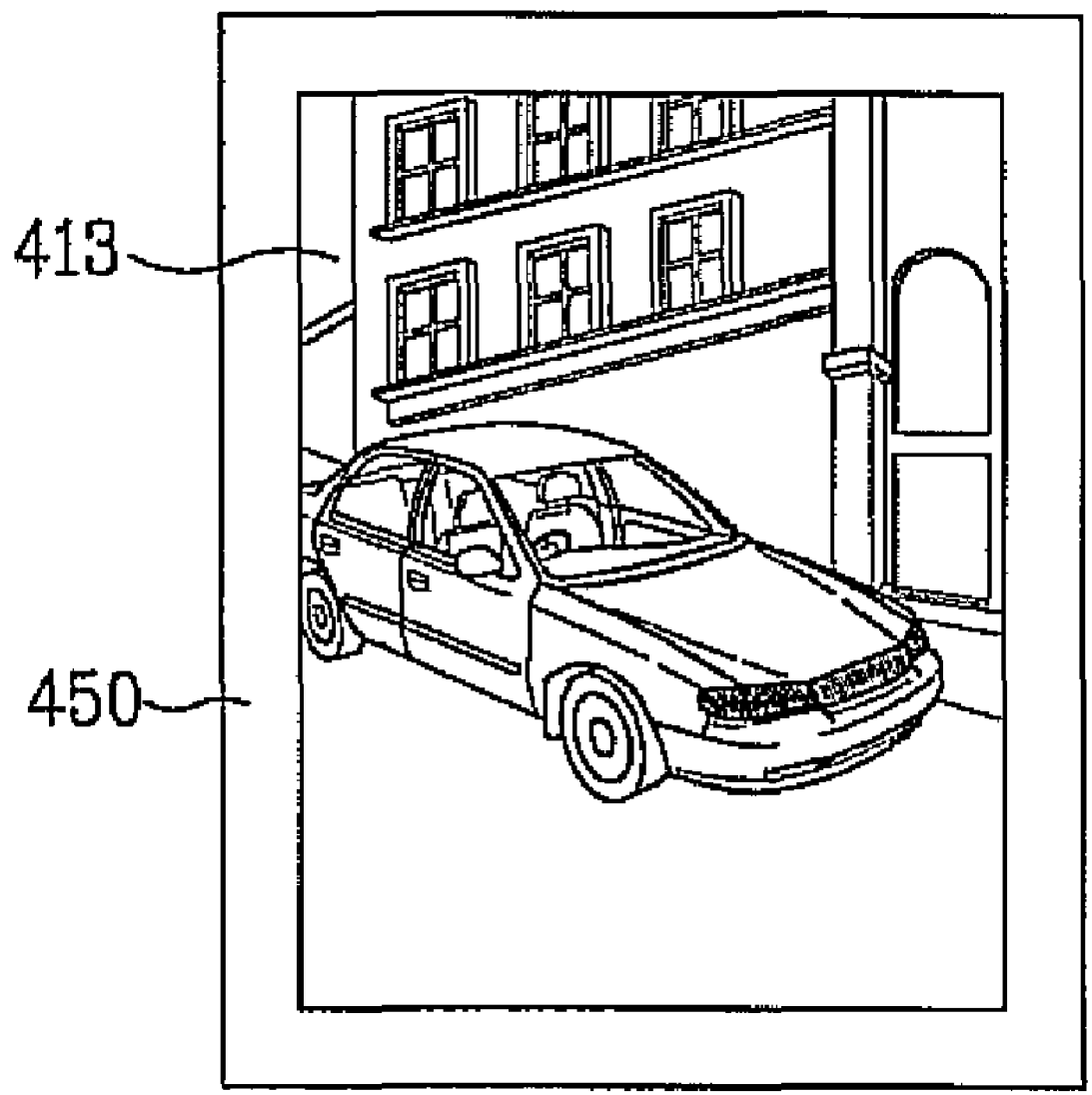

If an image 413 is photographed by the user, as illustrated in FIG. 4E, the first terminal transmits the photographed image to the second terminal, deactivates the image photographing function and then returns to the visual communication function, as illustrated in FIG. 4F. The image 413 received from the first terminal is displayed on the second screen 450 of the second terminal, as illustrated in FIG. 4G.

Figure 5:
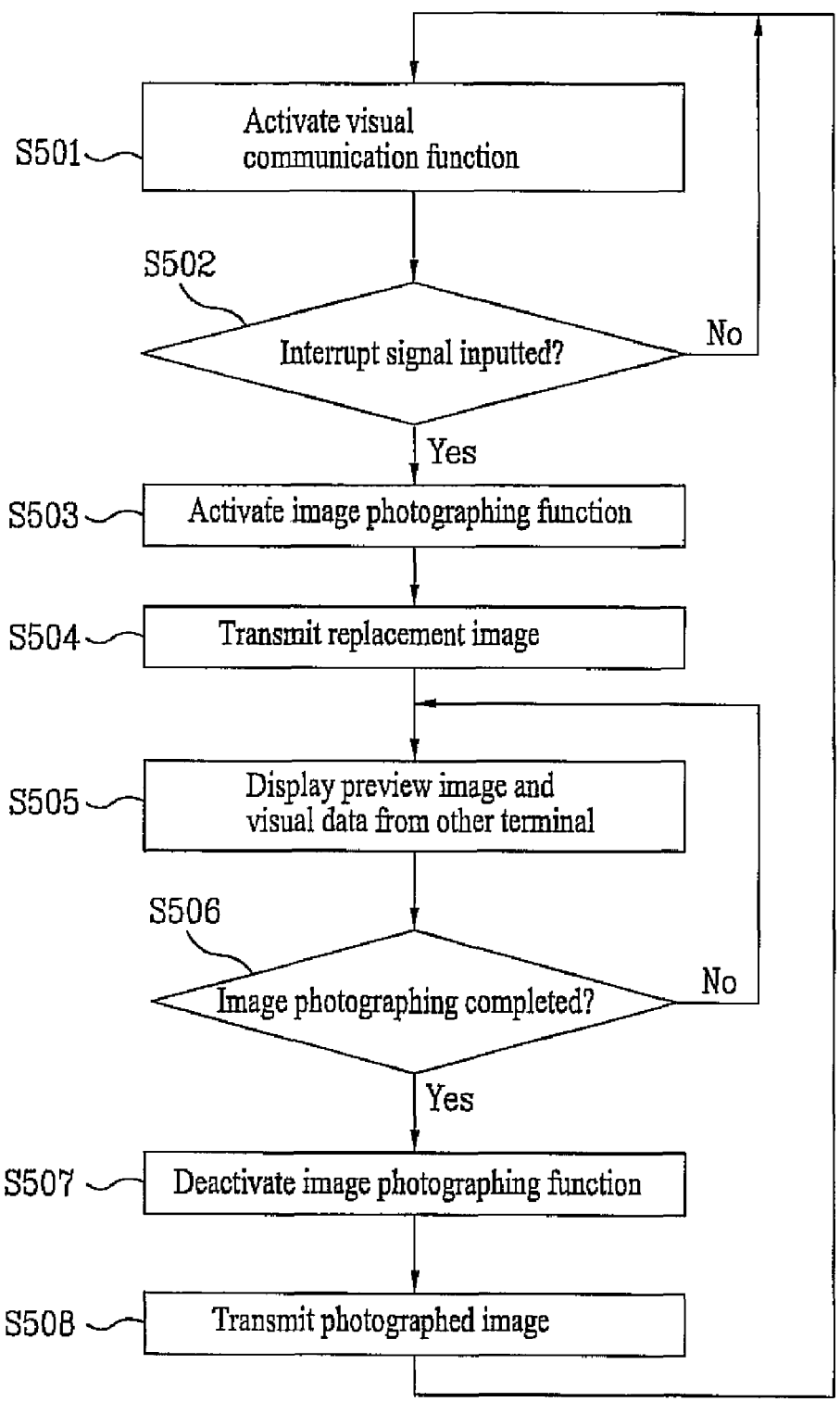
FIG. 5 is a flowchart of a method of processing visual data in a mobile terminal according to a second embodiment of the present invention.

FIG. 5 is a flowchart of a method of processing visual data in a mobile terminal 200 according to a second embodiment of the present invention. As illustrated in FIG. 5, a visual communication function is activated to perform visual communication with another terminal (S501). When an interrupt signal is received via the input unit 230 during the visual communication (S502), the control unit 270 activates an image photographing function while maintaining the visual communication function (S503).

Specifically, the image photographing function is executed, in addition to the visual communication function instead of terminating the visual communication function. The interrupt signal is a signal for activating the image photographing function according to the present invention.

The interrupt signal may be the signal generated when a user of the terminal 200 selects an image photographing menu using the input unit 230. The interrupt signal may be a signal generated by an image photographing dedicated key provided on one side of the first terminal. The interrupt signal may be a signal generated by detecting a rotation of the camera 220 when the user of the terminal 200 rotates the camera 220, which was facing the user.

The control unit 270 transmits an image previously stored in the storage unit 240 of the terminal to the other terminal via the communication unit 210 (S504) to replace the visual data when the image photographing function is activated. The control unit 270 transmits the replacement image according to a user's selection.

The replacement image may include a preview image received from the camera 220 while the image photographing function is activated. The replacement image may include a last visual communication frame image before the image photographing function was activated. The replacement image may include an image stored by a user. The replacement image may include at least one of a still image, a combination of a still image and audio and a combination of a moving picture and audio.

The camera 220 performs an image photographing operation instead of an operation for a visual communication if the image photographing function is activated while the terminal maintains a visual communication function. Since no visual data is transmitted to the other terminal while the image photographing function is activated, a user of the other terminal may experience a disconnection of the visual communication. Therefore, the replacement image is transmitted to the other terminal to replace the image of the first terminal's user while the image photographing function is performed.

The control unit 270 displays a preview image received from the camera 220 and visual data of the other terminal on the display unit 260 (S505) after the replacement image is transmitted to the other terminal. The control unit 270 displays the preview image separate from the visual data of the other terminal according to a user's selection such that the displayed preview image and the displayed visual data of the other terminal differ in size. The control unit 270 of the other terminal displays both the preview image and the replacement image on the display unit 260 such that the displayed preview image and the displayed replacement image differ in size.

The control unit 270 deactivates the image photographing function and returns to the visual communication function (S507) when the image photographing function is completed (S506). Specifically, the control unit 270 returns to the visual communication function and transmits visual communication data, such as the photographed image received from the camera 220, to the other terminal (S508) according to a user's selection. The control unit 270 also stores the photographed image in the storage unit 240.

FIGS. 6A to 6D are diagrams for explaining the method of processing visual data in a mobile terminal according to the second embodiment of the present invention. As illustrated in FIGS. 6A to 6D, a first screen 610 is a visual communication screen of a first terminal and a second screen 650 is a visual communication screen of a second terminal. Specifically, visual data 611 of the second terminal is displayed on the first screen 610 and visual data 651 of the first terminal is displayed on the second screen 650, as illustrated in FIG. GA.

Figure 6A:
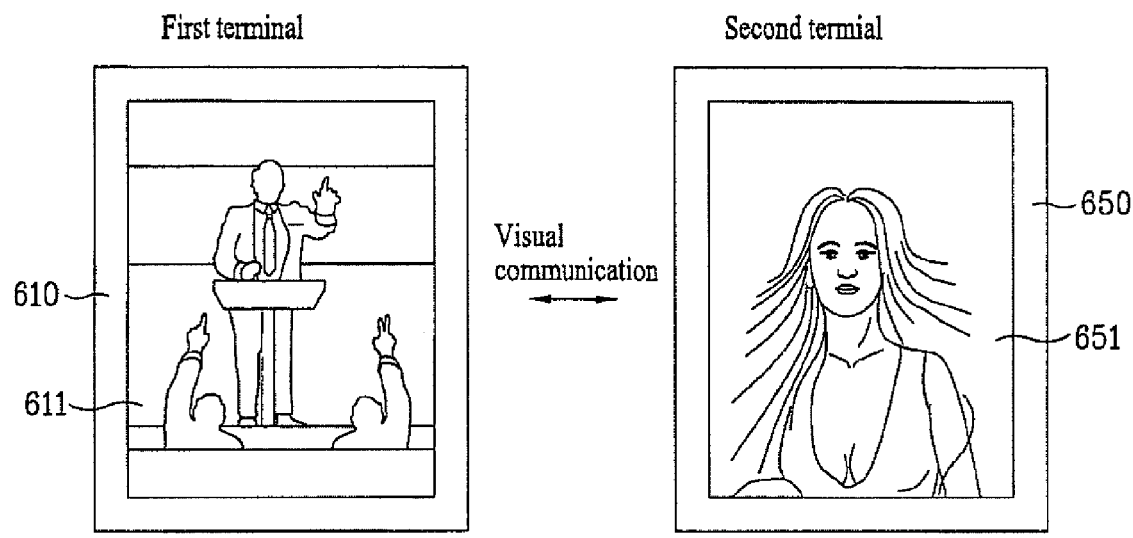
FIGS. 6A to 6D are diagrams illustrating the method of processing visual data in a mobile terminal according to the second embodiment of the present invention.
Figure 6B:
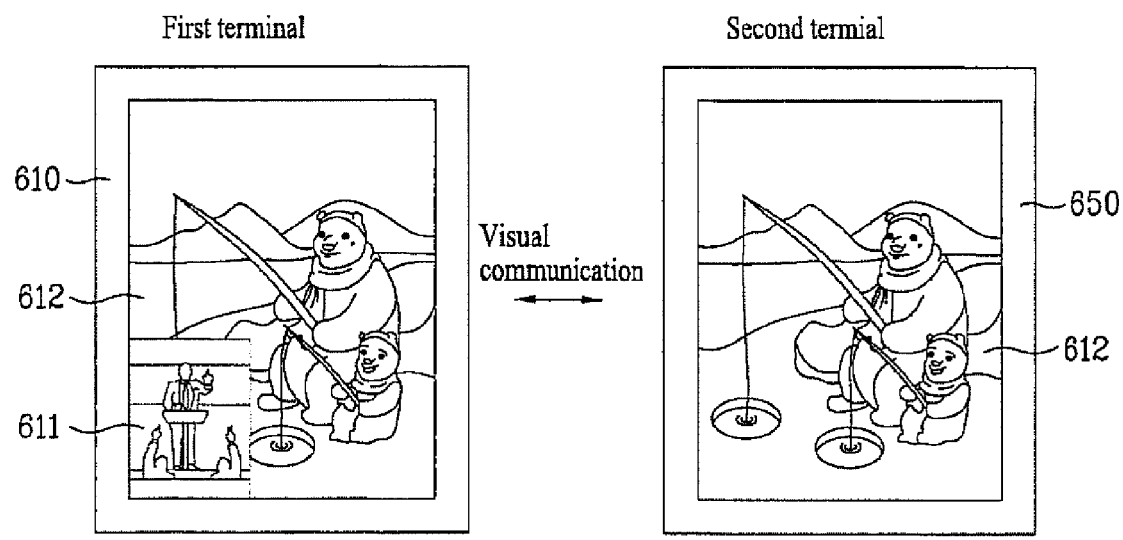

The first terminal activates the image photographing function and transmits a replacement image 612 to the second terminal when a user inputs a signal for activating the image photographing function. The first terminal displays both the replacement image 612 and the visual data 611 of the second terminal and the second terminal displays the replacement image 612 received from the first terminal, as illustrated in FIG. 6B.

Figure 6C:
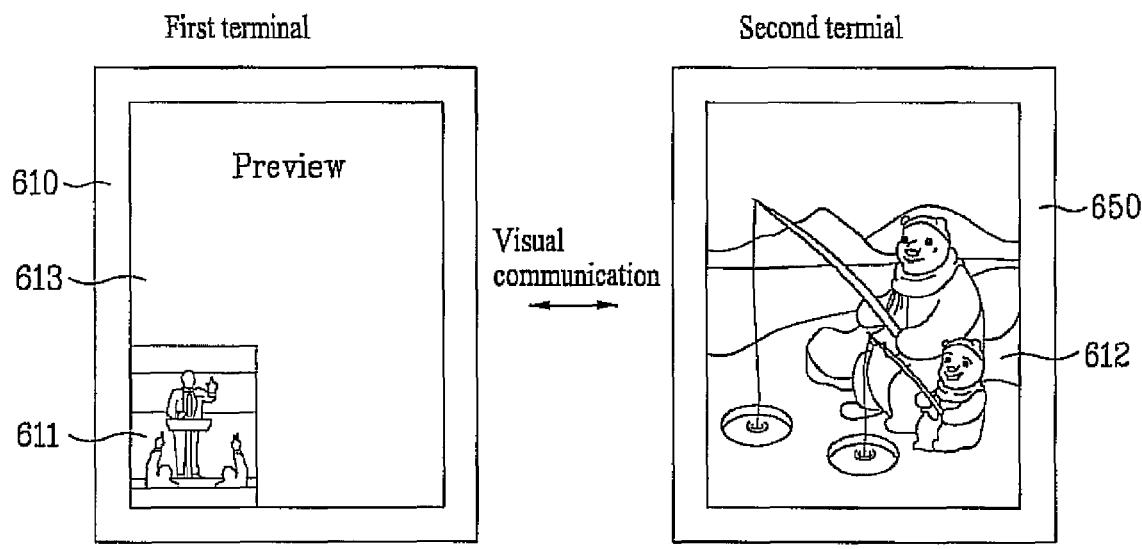
Figure 6D:
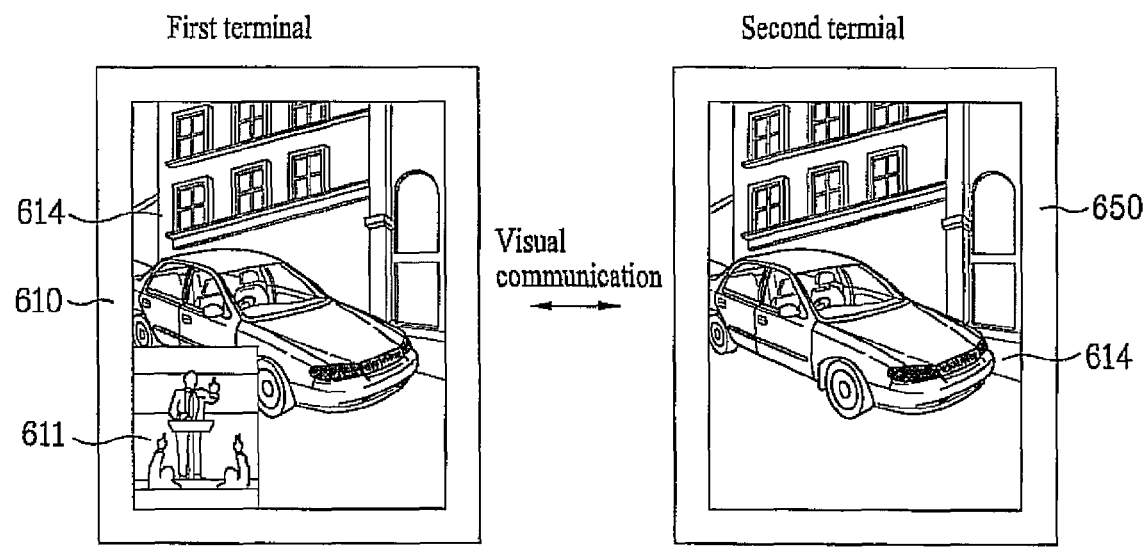

The first terminal displays both the preview image 613 currently received from the camera 220 and the visual data 611 of the second terminal after transmitting the replacement image 612, as illustrated in FIG. 6C. When photographing an image 614 is completed by a user, the first terminal transmits the photographed image to the second terminal, as illustrated in FIG. 6D, deactivates the image photographing function and returns to the visual communication function, as illustrated in FIG. 6A. After displaying the image 614 received from the first terminal, as illustrated in FIG. 6D, the second terminal switches the to the visual communication screen, as illustrated in FIG. 6A.

Figure 7:
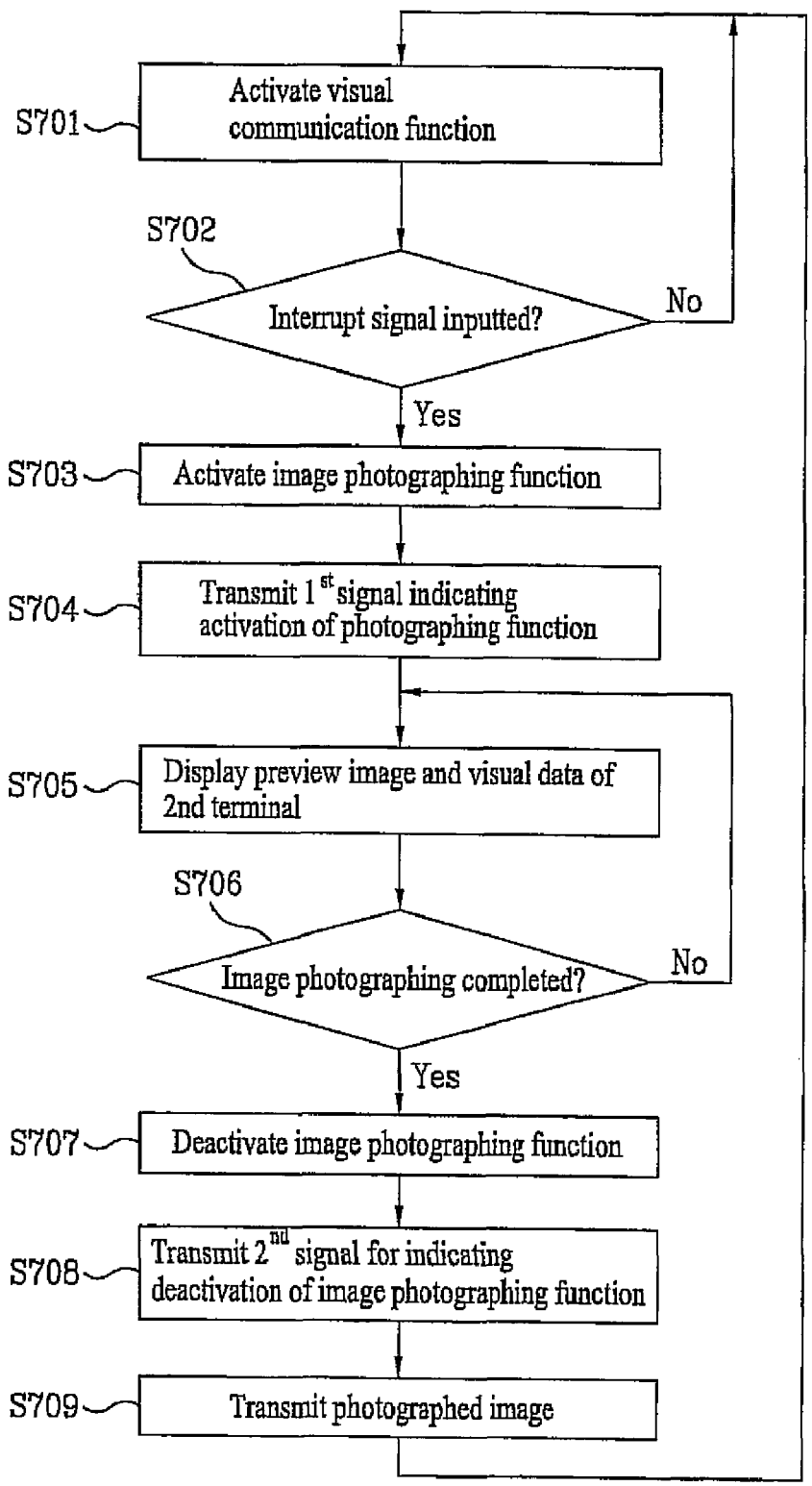
FIG. 7 is a flowchart of an operational process of the first terminal in visual data communicating with a second terminal according to a third embodiment of the present invention.

FIG. 7 is a flowchart of a method of a first terminal in communication with a second terminal according to a third embodiment of the present invention. As illustrated in FIG. 7, a visual communication function is activated to perform visual communication with a second terminal (S701). When an interrupt signal is received via the input unit 230 during the visual communication (S702), the control unit 270 of the first terminal activates an image photographing function while maintaining the visual communication function (S703).

The control unit 270 at the first terminal transmits a first signal indicating activation of the image photographing function to the second terminal via the communication unit 210 (S704) when the image photographing function is activated. The control unit 270 of the first terminal displays a preview image received from the camera 220 and visual data of the second terminal on the display unit 260 (S705) after the first signal has been transmitted to the second terminal. The control unit 270 of the first terminal displays the preview image separate from the visual data of the second terminal according to a user's selection such that the displayed preview image and the displayed visual data of the second terminal differ in size.

The control unit 270 of the first terminal deactivates the image photographing function and returns to the visual communication function (S707) when the image photographing function is completed (S706). The control unit 270 of the first terminal then transmits a second signal indicating deactivation of the image photographing function to the second terminal via the communication unit 210 (S708).

The control unit 270 of the first terminal then transmits the photographed image to the second terminal (S709). The step of transmitting the second signal may be omitted. If the second terminal receives the photographed image without receiving the second signal, the second terminal recognizes reception of the image as deactivation of the image photographing function of the first terminal.

Figure 8:
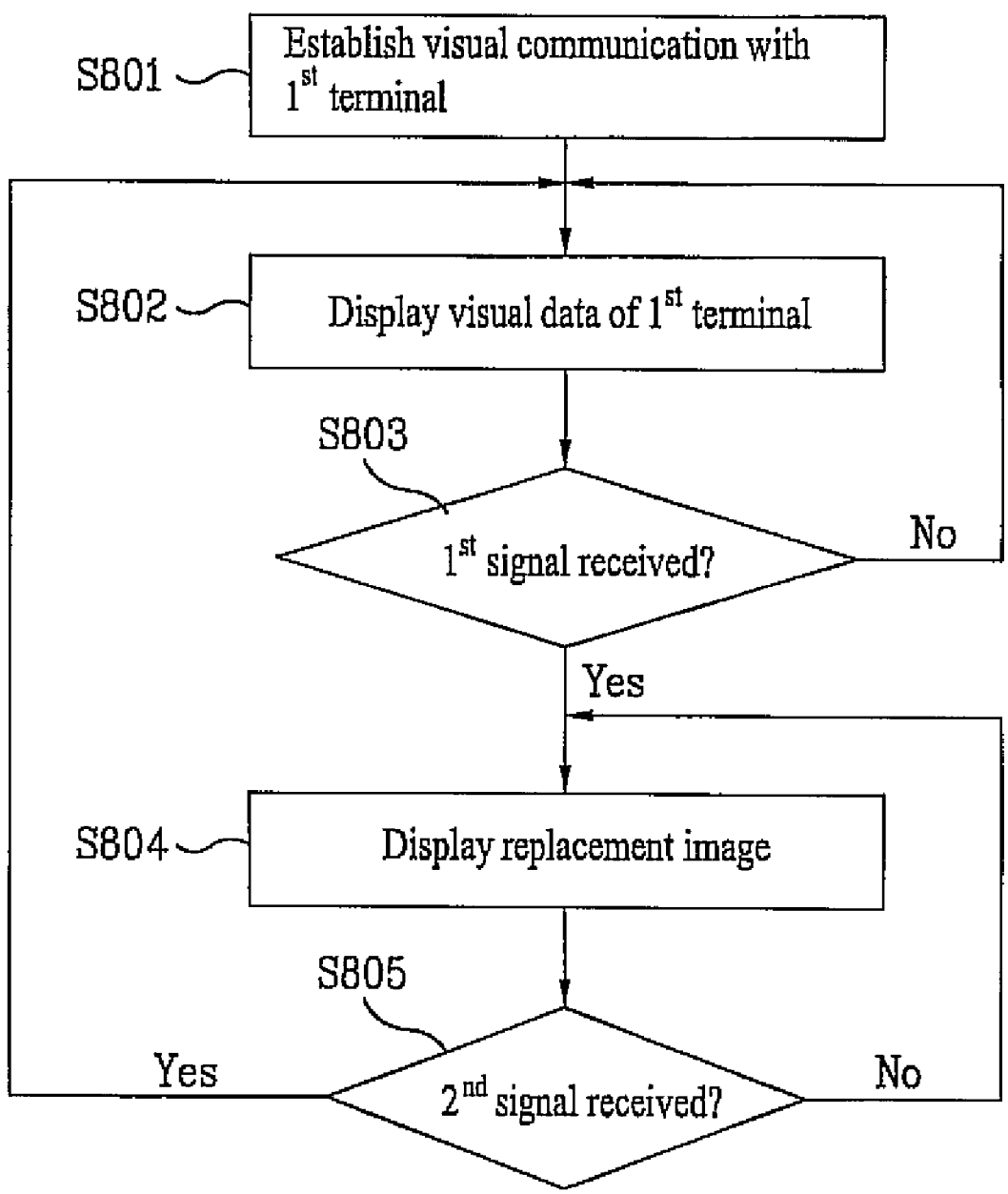
FIG. 8 is a flowchart of an operational process of the second terminal in visual data communicating with the first terminal according to a third embodiment of the present invention.

FIG. 8 is a flowchart of a method of the second terminal in communication with the first terminal according to the third embodiment of the present invention. As illustrated in FIG. 8, the second terminal establishes visual communication with the first terminal (S801) and displays visual data received from the first terminal on a visual communication screen (S802).

Upon receiving the first signal indicating activation of the image photographing function in the first terminal (S803), the second terminal displays a replacement image instead of the visual data of the first terminal on the visual communication screen (S804). Preferably, the replacement image includes an image selected by a user of the second terminal from among images stored in the storage unit 240 of the second terminal. Specifically, the replacement image may include at least one of a still image, a combination of a still image and audio, and a combination of a moving picture and audio.

Upon receiving the second signal indicating deactivation of the image photographing function of the first terminal (S805) while displaying the replacement image on the visual communication screen, the second terminal returns to step S802, stops displaying the replacement image and displays the visual data of the first terminal again (S802). The second terminal displays the image photographed by the first terminal if it is included in the second signal. The second terminal displays the image photographed by the first terminal for a predetermined time and then displays the visual data of the first terminal if the image photographed by the first terminal is received instead of the second signal.

Figure 9:
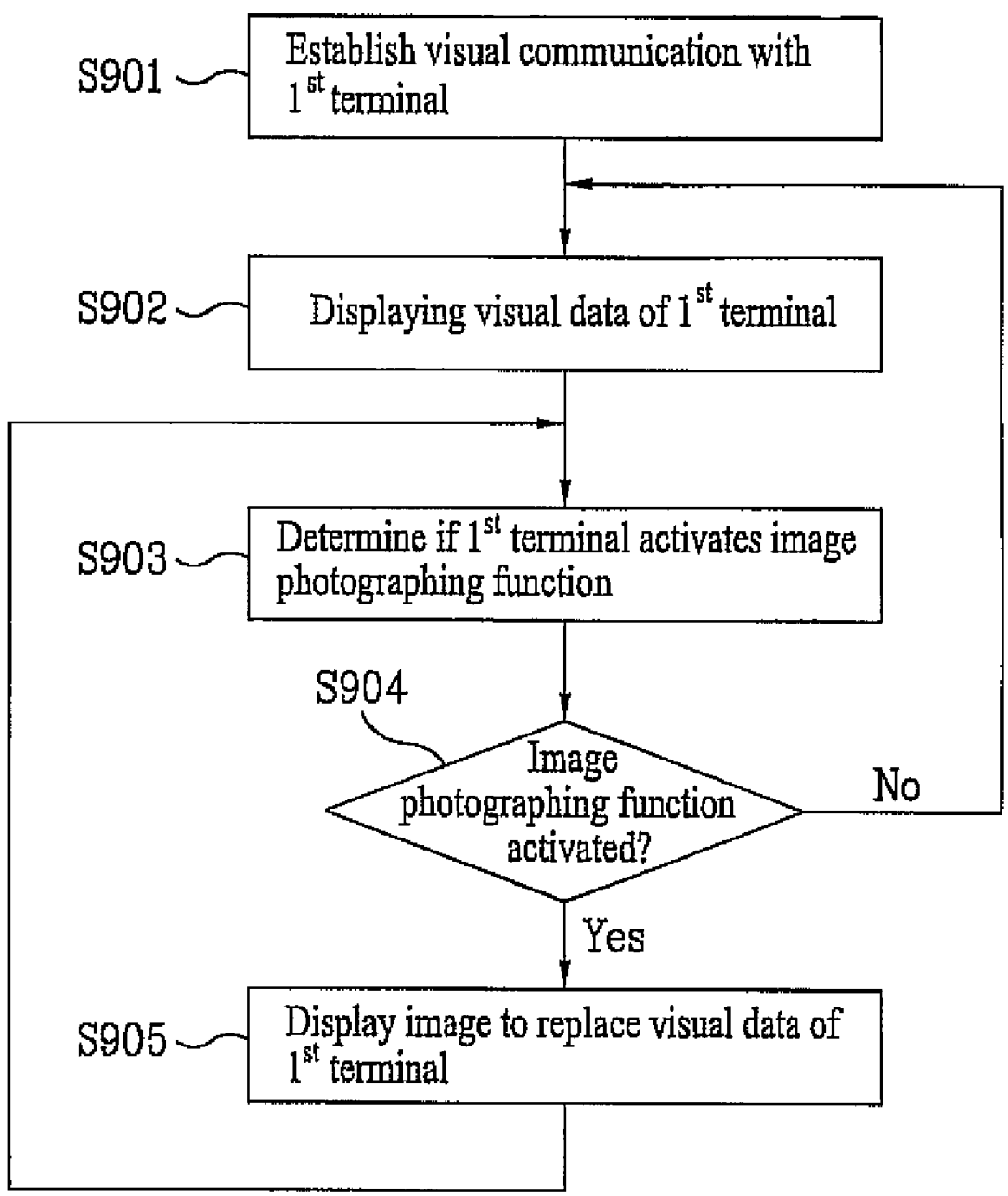
FIG. 9 is a flowchart of a method of processing visual data in a second terminal according to a fourth embodiment of the present invention.

FIG. 9 is a flowchart of a method of processing visual data in a second terminal according to a fourth embodiment of the present invention. As illustrated in FIG. 9. The control unit 270 of the second terminal establishes visual communication with the first terminal (S901) and displays visual data received from the first terminal via the communication unit 210 on a visual communication screen (S902).

Subsequently, the control unit 270 of the second terminal determines if the first terminal activates an image photographing function (S903). The control unit 270 of the second terminal may perform the determination in various ways.

For example, the control unit 270 of the second terminal can determine that the first terminal activates the image photographing function if the visual data of the first terminal for the visual communication is not received for a preset time during the visual communication. Furthermore, the control unit 270 of the second terminal may determine that the first terminal activates the image photographing function if a photographed image is received from the first terminal via the communication unit 210.

The control unit 270 of the second terminal displays a replacement image instead of the visual data of the first terminal on the visual communication screen of the display unit 260 (S905) if it is determined that the image photographing function is activated (S904). The replacement image may include at least one of a preview image input from the camera 200, the image received from the first terminal, a last visual communication frame image before the first terminal activated the image photographing function and a previously stored image. The replacement image may include at least one of a still image, a combination of a still image and audio and a combination of a moving picture and audio.

The control unit 270 of the second terminal displays both the replacement image and an image photographed by the first terminal if the photographed image is received from the first terminal while the replacement image is displayed on the display unit 260 and stores the received image in the storage unit 240. The control unit 270 of the second terminal displays the replacement image and received image such that the display sizes of the images is varied according to a user's selection.

The control unit 270 of the second terminal stops displaying the replacement image and displays the received visual data on the visual communication screen upon determining that the first terminal has deactivated the image photographing function. Specifically, the control unit 270 of the second terminal determines that the first terminal has deactivated the image photographing function upon receiving the visual data of the first terminal for visual communication within a preset time.

The present invention provides several effects or advantages. First, an image photographing function is provided during the course of a visual communication between a first terminal and a second terminal while the visual communication is maintained, thereby enabling a user to photograph an image using a camera and store a high quality image while performing visual communication with another user. Second, a second terminal is able to display an image replacing visual data of the first terminal when the first terminal uses an image photographing function, thereby enabling visual communication to be smoothly and seamlessly performed between the first and second terminals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of processing visual data in a mobile terminal, the method comprising:
    establishing visual communication with another terminal such that a first image is transmitted to the other terminal and visual data is received from the other terminal during the visual communication;
    displaying the first image and the visual data received from the other terminal on a display of the mobile terminal;
    receiving a request to activate an image photographing function while the visual communication is in progress;
    activating the image photographing function while maintaining the visual communication;
    receiving a second image via a camera of the mobile terminal upon activation of the image photographing function;
    displaying a preview image of the second image received from the camera;
    capturing the second image via the camera;
    transmitting the captured second image to the other terminal; and
    returning to the visual communication, deactivating the photographing function, and displaying an image that is transmitted to the other terminal during the visual communication and visual data received from the other terminal during the visual communication on the display of the mobile terminal.

2. The method of claim 1, wherein receiving the request to activate the image photographing function comprises at least detecting selection of an image photographing menu, detecting entry of a previously set key signal or detecting rotation of the camera.

3. The method of claim 2, wherein receiving the request to activate the image photographing function comprises detecting rotation of the camera.

4. The method of claim 2, wherein the image photographing menu is selected via an input unit of the mobile terminal or the previously set key signal is generated in response to user input received via the input unit of the mobile terminal, the input unit comprising a dedicated key for activating the image photographing function.

5. The method of claim 2, wherein the image photographing menu is selected via an input unit of the mobile terminal or the previously set key signal is generated in response to user input received via the input unit of the mobile terminal, the input unit comprising a touch pad or touch screen.

6. The method of claim 1, wherein the visual data received from the other terminal and the preview image of the second image are displayed concurrently on the display, and wherein the first image, which is displayed before the activation of the image photographing function, and the second image are not the same.

7. The method of claim 1, further comprising:
transmitting a replacement image to the other terminal upon activation of the image photographing function to replace the first image displayed at the other terminal with the replacement image, the replacement image being displayed at the other terminal temporarily while the image photographing function is performed until the second image is received by the other terminal,
wherein the replacement image displayed at the other terminal is replaced by the second image when the transmitted second image is received by the other terminal, wherein the replacement image and the second image are not the same.

8. The method of claim 7, wherein the replacement image comprises a last visual communication frame image prior to activating the image photographing function or an image stored in the mobile terminal.

9. The method of claim 1, further comprising:
notifying completion of the transmission of the second image, the transmitted second image displayed at the other terminal.

10. The method of claim 1, wherein only the preview image is displayed or the preview image is displayed with at least the first image or the visual data received from the other terminal while the image photographing function is activated based upon user selection.

11. The method of claim 1, further comprising:
discontinuing the transmission of the first image to the other terminal when the second image is transmitted to the second image.

12. The method of claim 11, further comprising:
resuming the transmission of the first image to the other terminal after completing the transmission of the second image.

13. The method of claim 1, wherein the first image is not displayed while the preview image is displayed on the display.

14. The method of claim 13, wherein the visual data received from the other terminal is not displayed while the preview image is displayed on the display.

15. A mobile terminal, comprising:
a camera;
a communication unit performing visual communication with another terminal;
a storage unit storing at least one image;
a display unit displaying data related to the visual communication, the data comprising a first image that is transmitted to the other terminal and visual data received from the other terminal during the visual communication; and
a control unit controlling the camera to perform an image photographing function when an activation signal is received,
wherein the visual communication with the other terminal is maintained while the image photographing function is performed if the activation signal is received while the visual communication is in progress,
wherein the control unit displays a preview image of a second image received via the camera and the second image captured via the camera on the display unit upon receiving the activation signal, transmits the captured second image to the other terminal via the communication unit, and returns to the visual communication, deactivating the photographing function, and displaying an image that is transmitted to the other terminal during the visual communication and visual data received from the other terminal during the visual communication on the display unit.

16. The mobile terminal of claim 15, wherein the activation signal comprises at least a signal for selecting an image photographing menu, a preset key signal or a signal indicating rotation of the camera.

17. The mobile terminal of claim 15, wherein the visual data received from the other terminal and the preview image of the second image are displayed concurrently on the display unit, and wherein the first image, which is displayed before the activation of the image photographing function, and the second image are not the same.

18. The mobile terminal of claim 17, wherein the replacement image comprises a last visual communication image prior to activation of the image photographing function or an image stored in the mobile terminal.

19. The mobile terminal of claim 15, wherein the control unit transmits a replacement image to the other terminal via the communication unit upon activation of the image photographing function to replace the first image displayed at the other terminal with the replacement image, the replacement image being displayed at the other terminal temporarily while the image photographing function is performed until the second image is received by the other terminal,
wherein the replacement image displayed at the other terminal is replaced by the second image when the transmitted second image is received by the other terminal, wherein the replacement image and the second image are not the same.

20. The mobile terminal of claim 15, wherein the control unit notifies completion of the transmission of the second image, the transmitted second image displayed at the other terminal.

21. The mobile terminal of claim 15, wherein only the preview image is displayed or the preview image is displayed with at least the first image or the visual data received from the other terminal while the image photographing function is activated based upon user selection.

22. The mobile terminal of claim 15, further comprising:
an input unit configured to receive user input for selecting the image photographing menu or for generating a previously set key signal,
wherein the input unit comprises a dedicated key for activating the image photographing function.

23. The mobile terminal of claim 15, further comprising:
an input unit configured to receive user input for selecting the image photographing menu or for generating a previously set key signal,
wherein the input unit comprises a touch pad or touch screen.

24. A method of processing visual data in a mobile terminal, the method comprising:
- establishing visual communication with another terminal such that a first image is received from the other terminal during the visual communication;
- displaying visual data of the other terminal on a display of the mobile terminal, the visual data being related to the visual communication and comprising the first image;
- determining that the other terminal activates an image photographing function while the visual communication is in progress;
- replacing the visual data of the other terminal with a replacement image, the replacement image being displayed while the image photographing function is activated;
- receiving a second image from the other terminal, the second image captured via a camera of the other terminal while the image photographing function is activated and the visual communication is maintained between the mobile terminal and the other terminal; and
- replacing the replacement image with the received second image being displayed on the display,
- wherein the first image, which is displayed before being replaced by the replacement image, and the second image are not the same.

25. The method of claim 24, wherein determining that the other terminal activates the image photographing function comprises receiving a signal from the other terminal or determining that the visual data of the other terminal is not received for a preset time while the visual communication is in progress.

26. The method of claim 24, wherein the replacement image is at least an image received from the other terminal, a preview image of the second image received from the other terminal, a last visual communication frame image before the other terminal activated the image photographing function, or an image stored in the mobile terminal.

27. A mobile terminal, comprising:
- a camera;
- a communication unit establishing visual communication with another terminal such that a first image is received from the other terminal during the visual communication;
- a display unit displaying visual data of the other terminal, the visual data comprising the first image received from the other terminal;
- a storage unit storing an image; and
- a control unit determining that the other terminal activates an image photographing function while the visual communication is in progress and replacing the visual data of the other terminal on the display unit with a replacement image, the replacement image being displayed while the image photographing function is activated,
- wherein the control unit receives a second image from the other terminal via the communication unit, the second image captured via a camera of the other terminal while the image photographing function is activated and the visual communication is maintained between the mobile terminal and the other terminal,
- wherein the control unit replaces the replacement image with the received second image being displayed on the display unit, and
- wherein the first image, which is displayed before the activation of the image photographing function, and the second image are not the same.

28. The mobile terminal of claim 27, wherein determining, by the control unit, that the other terminal activates the image photographing function comprises receiving a signal from the other terminal or determining that the visual data of the other terminal is not received for a preset time while the visual communication is in progress.

29. The mobile terminal of claim 27, wherein the replacement image is at least an image received from the other terminal, a preview image of the second image received from the other terminal, a last visual communication frame image before the other terminal activated the image photographing function the image stored in the storage unit.

* * * * *